United States Patent

[11] 3,622,304

| [72] | Inventors | Sanaa E. Khalafalla<br>Minneapolis;<br>Larry A. Haas, Burnsville; Howard W. Kilau, St. Paul, all of Minn. |
|---|---|---|
| [21] | Appl. No. | 16,206 |
| [22] | Filed | Mar. 3, 1970 |
| [45] | Patented | Nov. 23, 1971 |
| [73] | Assignee | The United States of America as represented by the Secretary of the Interior |

[54] FERROTHERMIC EXTRACTION OF COPPER
9 Claims, 1 Drawing Fig.

[52] U.S. Cl. .................................................. 75/72, 75/74
[51] Int. Cl. ..................................................... C22b 15/14

[50] Field of Search ............................................. 75/72, 74

[56] References Cited
UNITED STATES PATENTS
1,886,903  11/1932  Ralston ........................  75/74
2,082,284  6/1937  Goetz ...........................  75/90 X Primary Examiner—L. Dewayne Rutledge
Assistant Examiner—J. E. Legru
Attorneys—Ernest S. Cohen and Roland H. Shubert ABSTRACT: Metallic copper is extracted from nonsulfidic copper minerals by means of a solid state cementation technique in which metallic iron is reacted with copper minerals at temperatures above about 500° C.

PATENTED NOV 23 1971
3,622,304
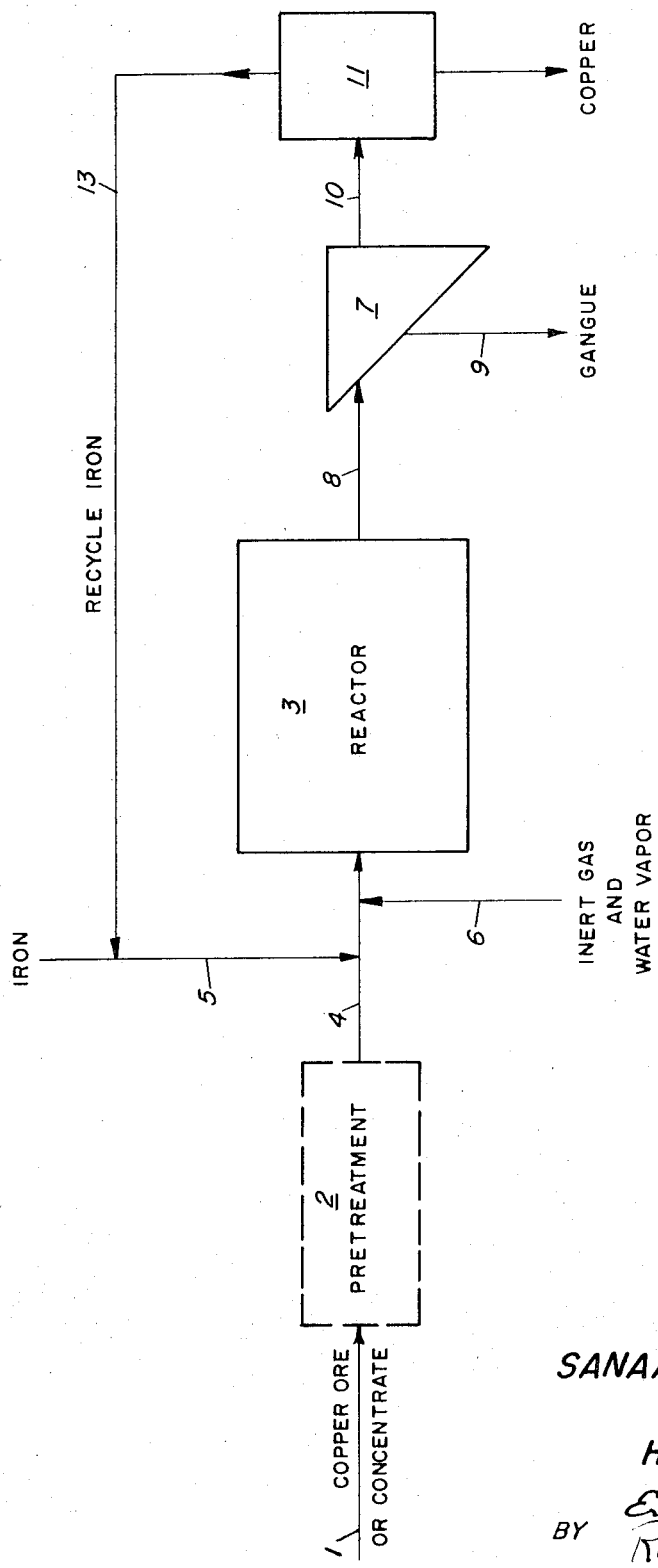
INVENTORS
SANAA E. KHALAFALLA
LARRY A. HAAS
HOWARD W. KILAU
BY Ernest S. Cohen
Roland H. Shubert
ATTORNEYS

FERROTHERMIC EXTRACTION OF COPPER

BACKGROUND OF THE INVENTION

Liquid state cementation techniques have long been used to recover metallic copper from ionic solutions. In these processes, a solution containing copper ions is passed over metallic iron precipitating copper metal and taking iron into solution. Typical of copper-containing solutions treated in this manner are those produced by the sulfuric acid leaching of low grade copper ores.

Copper is usually leached from its ores using dilute acids or ammoniacal ammonium carbonate, followed by electrolysis or cementation of the leach liquor to recover copper. However, leaching methods are inefficient when copper is in the form of carbonates (malachite or azurite, both of which are invariably associated with dolomite and limestone), silicates such as dioptase and chrysocolla, or mixed sulfide-oxide ore. Ores containing carbonates and silicates require calcining to the oxide before leaching can be applied. Silicate ores dissolve slowly and are acid-consuming because of the formation of silica gel which also creates processing difficulties.

Leaching methods are invariably slow and often create problems of water pollution. In addition, cost of the leaching agent is often substantial, especially in those operations in which loss of leaching agent is high.

SUMMARY OF THE INVENTION

It has now been found that metallic copper may be recovered from nonsulfidic copper-containing minerals by use of a solid state cementation technique. In the process, metallic iron in such forms as tin cans and industrial scrap, is contacted with the copper mineral at elevated temperatures in a nonoxidizing atmosphere. Reaction temperatures range from about 500° C. to the melting point of copper. Rapid and substantially complete copper metallization occurs at temperatures above about 560° C.

Hence, it is an object of this invention to recover metallic copper from nonsulfidic copper compounds and minerals.

Another object of this invention is to provide a dry, solid-state, ferrothermic reduction process to win copper from its ores.

DETAILED DESCRIPTION OF THE INVENTION

The drawing comprises a flow sheet, in diagrammatic form, of one embodiment of the invention.

The method of this invention is essentially a solid state cementation technique based primarily on the relative positions of iron and copper in the electromotive series of metals. Reactions taking place in the process are in many ways analogous to the Goldschmidt thermite process by which nobler metals can be obtained by heating their compounds with more electropositive elements. It differs from that process, however, in that the reactions take place in the solid state.

Turning now to the drawing, there is shown a diagrammatic flow sheet for the process. A copper ore or concentrate feed 1 may be subjected to a pretreatment step 2 or may be passed directly to the reactor 3 depending upon composition of the copper-containing feed. Pretreatment step 2 preferably comprises a low-temperature calcining in the case of copper carbonate ores. Such a low-temperature calcining step may be carried out in a conventional rotating kiln or other suitable processing vessel. In the case of copper sulfides, pretreatment 2 comprises a substantially complete oxidative roasting to decompose the sulfides and form copper oxides. Since copper sulfides are nonreducible in the process, it is desired that conversion of the sulfides be as complete as possible. Roasting of copper sulfide ores may be done in any conventional fashion but a fluidized bed process is preferred.

After pretreatment, the copper-containing material is passed via conveying means 4 to reactor 3. Reactor 3 preferably comprises a rotating kiln having indirect heating means. Such kilns are well known and commonly used in chemical processing. Introduced into the kiln along with the copper compound is metallic iron 5. The iron may be in finely divided form, such as that used in powder metallurgy, but it is preferred that it be scrap in the form of shredded sheets, turnings and the like. Shredded auto body scrap and tin cans are particularly preferred. Quantity of iron introduced may range over rather broad limits but it is preferred that the iron be introduced in roughly stoichiometric amounts based upon an iron oxide product with oxidation state of +2. In general, it is desired to hold the quantity of iron introduced within the range of about 0.7 to 2 times the stoichiometric amount required for reduction of copper compounds to the metal based again on an iron oxidation state of 2.

Reduction must take place in a nonoxidizing atmosphere; preferably comprising nitrogen containing small amounts of water vapor. Inert gas and water vapor may be introduced into the reactor via line 6. Concentration of water vapor may range from about 0.1 to about 10 percent but a preferred range is from about 0.3 to about 3 percent.

In its broadest sense, this process can be carried out in a temperature range from about 500° C. to the melting point of copper or 1083° C. Below about 500° C., the reaction proceeds at too slow a rate and is too incomplete to be practical. At about 560° C., the reaction proceeds rapidly to essentially complete copper metallization. It is desired to avoid extremely high temperatures because of solubility considerations. Maximum solubility of copper in iron ($\alpha$-phase) is 2.1 percent, reached at 850° C. Maximum solubility of iron in copper ($\epsilon$-phase) is 3.5 percent, reached at 1083° C., the melting point of copper. In an operating system, at least part of the copper dissolving in iron would be lost while any iron dissolving in the copper would constitute and undesirable contaminant.

In the case of carbonate ores, such as malachite and azurite, it may be advantageous to subject the ore or concentrate to preliminary low-temperature calcining in order to drive off carbon dioxide. Both azurite and malachite decompose at temperatures above about 200° to 250° C. and the preliminary calcining step may be operated as a preheating step for the ferrothermic reduction. Carbon dioxide tends to have a slight inhibiting effect on the reaction as will be detailed later.

Especially when treating carbonate ores, or any other ore or concentrate which contains either limestone or dolomite as gangue material, it is advantageous to conduct the process at the lower end of the operative temperature range. Both limestone and dolomite begin to decompose to form the oxides at temperatures above about 750° to 850° C. Decomposition, of course, releases carbon dioxide which is undesirable in the reaction atmosphere. More importantly, calcining of limestone and dolomite to form the oxides is an endothermic reaction which would substantially decrease the efficiency of the process. For these reasons, as well as for general heat economy, it is preferred to carry out the process in the lower portion of the operative range, or from about 560° to about 650° C.

From the reactor, the reaction mass is passed to separation means 7 via conveying means 8. Separation means 7 preferably comprises means to separate metallic copper and unreacted iron from gangue materials based upon specific gravity differences. Means 7 may comprise jigs, air tables or other conventional separatory devices. It is preferred that means 7 be so operated to split the reaction mass into two fractions; one traction comprising gangue material 9 and the other fraction 10 comprising metallic copper and any residual metallic iron. Fraction 10 may then be passed into a magnetic separator 11 from which is recovered a copper product fraction 12 and an unreacted iron recycle fraction 13.

Effect of process variables is more fully illustrated in the following examples.

EXAMPLE 1

The effect of temperature on the ferrothermic reduction of cuprous oxide was investigated in the range of 390° to 1100°

C. Experimental procedure was as follows: Cuprous oxide and iron powder (−100 mesh) were mixed together in a copper-to-iron molar ratio of 2. This molar ratio would correspond to the following reaction equation:

$$Cu_2O + Fe \rightarrow FeO + 2Cu.$$

The mixed reactant charge was placed in an alumina crucible and was then inserted into a vertical tube furnace. Next, the crucible and contents were rapidly heated to the desired test temperature, held at test temperature for 3 hours, and slowly cooled. An inert helium atmosphere was maintained during the entire test period. The reaction product was then removed, ground, and analyzed for its metallic copper content. Results of the tests are set out in the following table:

TABLE I

| Test Temperature °C. | Copper Metallization % |
|---|---|
| 390 | 5.4 |
| 440 | 9.2 |
| 560 | 96.4 |
| 650 | 96.9 |
| 740 | 96.3 |
| 765 | 94.9 |
| 950 | 98.6 |
| 950 | 98.9 |
| 950 | 99.8 |
| 1100 | 98.9 |

As may be seen from the table, there is little advantage gained in operating the process at temperatures much higher than 560° C.

EXAMPLE 2

The effect of varying reactant proportions was next studied at a temperature of 765° C. Three different proportions of reactants were used corresponding to copper-to-iron molar ratios of 1, 2 and 8/3. A molar ratio of 2 corresponds to the wustite-forming reaction as set out in example 1. A molar ratio of 8/3 corresponds to the magnetite-forming reaction:

$$4Cu_2O + 3Fe \rightarrow Fe_3O_4 + 8Cu$$

A molar ratio of 1 of course provides an excess of reductant. Results of the tests are as follows:

TABLE II

| Copper-to-iron Molar ratio | Copper Metallization % |
|---|---|
| 1 | 99.2 |
| 2 | 96.3 |
| 8/3 | 85.9 |

As was expected, increased reduction was obtained as the iron content was increased. Free energy considerations indicate that the magnetite forming reaction is favored. However, this was apparently more than offset by the lessened surface area available for reaction.

EXAMPLE 3

It was expected that physical form of the iron reductant would have a very significant effect on the process. Iron in three different forms was tested as a reductant, under static conditions, at a temperature of 950° C. In the first experiment, cuprous oxide was blended with iron powder as previously described. In other tests, the reductant consisted of tin can strips cut in the form of a helix. Other tests utilized iron strips cut from scrap automobile bodies. In those tests using either tin cans or auto body strips, cuprous oxide was packed around the iron within an alumina crucible. Results of the tests are set out in the following table:

TABLE III

| Reductant form | Copper-to-iron Molar ratio | Copper metallization % |
|---|---|---|
| Iron powder | 2.0 | 98.6 |
| Tin can helix | 2.0 | 39.0 |
| Tin can helix | 1.5 | 46.4 |
| Tin can helix | 1.2 | 62.9 |
| Tin can helix plus auto scrap | 1.0 | 75.6 |
| Tin can helix plus auto scrap | 0.7 | 89.5 |
| Auto scrap | 2.0 | 17.0 |

A first conclusion which may be drawn from the data is that the degree of copper metallization is highly dependent upon surface area of the iron reductant. A second and extremely significant finding was the high degree of solid-state mobility or transport of the reactants. In a nonstatic reaction such as in a rotating drum or mill, surface area would be much less limiting since tumbling action of the reactants would continuously present new reaction surfaces. In such an embodiment, solid state transport mechanisms would cease to be a major inhibiting factor on reaction rates or degree of copper metallization.

EXAMPLE 4

In the magnetic roasting of iron ore with steel scrap, it is known that small amounts of carbon dioxide and water vapor in the reaction atmosphere converts the process from a sluggish solid-solid type to a cyclic gas-solid type. An analogous postulated reaction mechanism for this process may be illustrated by the following equations:

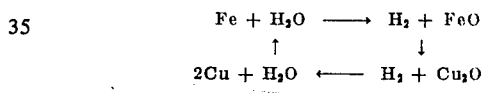

Effect of the reaction atmosphere condition, either static or flowing was also investigated. Two series of test were run. In the first series, cuprous oxide was reacted with iron powder at a temperature of 760° C. Molar ratio of copper to iron was 8/3. Results of these tests are as follows:

TABLE IV

| Atmosphere | Copper Metallization (%) |
|---|---|
| Flowing helium | 85.9 |
| Static helium | 93.2 |
| Static helium +3% $H_2O$ | 93.6 |
| Static helium +1% $CO_2$ | 88.1 |

In the second series of tests, cuprous oxide was reacted with strips of steel scrap from auto bodies at 935° C. Molar ratio of copper to iron was 2. Results of these tests are as follows:

TABLE V

| Atmosphere | Copper Metallization (%) |
|---|---|
| Flowing helium | 17.1 |
| Static helium | 35.5 |
| Static helium+3% $H_2O$ | 56.6 |
| Static helium+0.6% $H_2O$ | 58.2 |

In both series of tests, a static atmosphere was superior to a flowing atmosphere. No readily discernible explanation for this result is known. Carbon dioxide appeared to have a slight adverse effect while small concentrations of water vapor exerted a definite beneficial effect on the reaction.

Helium was used in these tests because of its complete inertness but is not contemplated for use in a commercial embodiment of the process because of its high cost. In another series of tests, nitrogen was substituted for helium and essentially the same results were obtained. Nitrogen is the most preferred inert gas for use in the process.

What is claimed is:

1. A process for producing metallic copper from a nonsulfidic copper-containing compound which comprises contacting the compound with metallic iron in a nonoxidizing atmosphere at a temperature above about 500° C. and below the melting point of copper for a period of time sufficient to reduce a substantial portion of the copper compound to metallic copper.

2. The process of claim 1 wherein the metallic iron is in shredded form derived from industrial and domestic scrap.

3. The process of claim 2 wherein the contacting is carried out in a rotating kiln.

4. The process of claim 3 wherein the nonoxidizing atmosphere comprises nitrogen and water vapor.

5. The process of claim 4 wherein the reaction temperature is in the range of about 560° to about 650° C.

6. The process of claim 5 wherein the ratio of iron to copper in the contacting step is in the range of 0.7 to about 2 times the stoichiometric amount required for reduction of the copper to metallic form based upon an iron oxide product having iron in the oxidation state of +2.

7. The process of claim 6 wherein the copper compound is a carbonate and wherein it is subjected to a low temperature calcination prior to reduction sufficient to decompose the carbonate to oxide.

8. The process of claim 6 wherein metallic copper is separated from gangue materials after reduction by physical means based upon specific gravity differences between copper and gangue.

9. The process of claim 8 wherein unreacted iron is separated from metallic copper and is recycled back to the reduction step.

* * * * *